United States Patent
Madariaga Zubimendi

(10) Patent No.: US 12,160,163 B2
(45) Date of Patent: Dec. 3, 2024

(54) METHOD FOR OBTAINING SWITCHING ANGLES FOR A POWER ELECTRONIC CONVERTER, AND ASSOCIATED CONVERSION SYSTEM

(71) Applicant: INGETEAM POWER TECHNOLOGY, S.A., Zamudio (ES)

(72) Inventor: Danel Madariaga Zubimendi, Zamudio (ES)

(73) Assignee: INGETEAM POWER TECHNOLOGY, S.A., Bizkaia (ES)

( * ) Notice: Subject to any disclaimer, the term of this patent is extended or adjusted under 35 U.S.C. 154(b) by 28 days.

(21) Appl. No.: 18/190,804

(22) Filed: Mar. 27, 2023

(65) Prior Publication Data
US 2023/0308005 A1  Sep. 28, 2023

(30) Foreign Application Priority Data
Mar. 28, 2022  (EP) .................................... 22382284

(51) Int. Cl.
*G06F 1/12* (2006.01)
*G06F 1/26* (2006.01)
*H02M 1/00* (2006.01)

(52) U.S. Cl.
CPC ............ *H02M 1/0012* (2021.05); *G06F 1/26* (2013.01)

(58) Field of Classification Search
None
See application file for complete search history.

(56) References Cited

FOREIGN PATENT DOCUMENTS
EP  3 657 653 A1  5/2020

OTHER PUBLICATIONS

John N. Chiasson, et al., "A New Approach to Solving the Harmonic Elimination Equations for a Multilevel Converter", Conference Record Of The 2003 IEEE Industry Applications Conference. 38th. IAS Annual Meeting, Salt Lake City, UT, Oct. 12-16, 2003, pp. 640-647, vol. 1.
Mingzhe Wu, et al., "Unified Selective Harmonic Elimination Control for Four-Level Hybrid-Clamped Inverters", IEEE Transactions on Power Electronics, Nov. 2020, pp. 11488-11501, vol. 35, No. 11.
European Search Report for EP 22 38 2284 dated Aug. 29, 2022.

*Primary Examiner* — Nitin C Patel
(74) *Attorney, Agent, or Firm* — Sughrue Mion, PLLC

(57) ABSTRACT

The present invention relates to a method for obtaining switching angles ($\alpha_1, \ldots, \alpha_i$), and to an associated conversion system. In the method, possible values (IM) are established for a modulation index, within a predetermined range of values (R) and divided into a plurality of segments ($S_1, \ldots, S_j$); a value is obtained for each of the switching angles ($\alpha_1, \ldots, \alpha_i$) in each segment ($S_1, \ldots, S_j$) and for each of the possible values (IM); a switching curve (SC) is formed for each switching angle ($\alpha_1, \ldots, \alpha_i$) over the entire range (R); and the height or amplitude and the slope of each switching curve (SC) at a possible value shared by two segments ($S_1, \ldots, S_j$) are considered constant.

9 Claims, 3 Drawing Sheets

METHOD FOR OBTAINING SWITCHING ANGLES FOR A POWER ELECTRONIC CONVERTER, AND ASSOCIATED CONVERSION SYSTEM

TECHNICAL FIELD

The present invention relates to methods for obtaining switching angles for a power electronic converter, in particular for a plurality of switches of said converter, and to an associated conversion system comprising at least one power electronic converter with a plurality of switches.

PRIOR ART

Power conversion systems using at least one power electronic converter are well known. Converters receive a DC or AC power and convert it to DC or AC power in a specific manner depending on the application and requirements.

For example, a power converter can be connected to a DC power source at the input and to a power grid at the output. In this case, the converter converts DC power into AC power to supply it to the grid and is known as an inverter. Furthermore, the conversion can be performed such that, in the resulting output power, a series of harmonics is eliminated or at least mitigated according to the requirements established.

To carry out conversions and to be able to eliminate or at least mitigate the required harmonics, different modulation techniques consisting of chopping the input voltage set point signal for obtaining the required output voltage signal are known. Converters comprise a plurality of semiconductors, such as IGBTs for example, and to perform the indicated chopping with the different modulation techniques, different switching angles are generated for the semiconductors (the moments of opening/closing for the semiconductors) for obtaining the corresponding output voltage signal. The set point signal is chopped in a controlled manner by opening and closing the semiconductors in a controlled manner.

Each modulation technique uses at least one specific algorithm for obtaining said switching angles, and the harmonics to be eliminated and/or mitigated, and even the desired number of switching operations (of switching angles) in each period (or in each quadrant) are taken into account in said algorithm. The AC output signal is periodic and symmetrical, so usually calculating the switching angles for a single quadrant is sufficient for obtaining switching angles for all the quadrants (the rest of the switching angles for the rest of the quadrants are obtained by symmetries).

The AC output signal may have a larger or smaller amplitude with respect to the input signal, which is determined by the modulation index applied, the value of which is usually 1 or less. The modulation index reflects the relationship between the fundamental voltage of the AC output signal and the maximum voltage obtainable (which depends on the input voltage). Therefore, depending on the modulation index applied, the chopping must be different, and, therefore, the switching angles must be different. In this sense, one switching pattern corresponds to each modulation index, each switching pattern comprising the switching angles to be executed with the corresponding modulation index. Each acceptable switching pattern must result in an AC output signal with the required characteristics, which characteristics are represented in an objective function.

A very common modulation technique is the technique known as PWM (Pulse Width Modulation). This technique allows generating a pulse train having a variable width voltage with a mean value in each pulse that coincides with the mean value of the demanded voltage set point. The PWM modulation technique has very good dynamic response characteristics, but it has the drawback of generating many harmonics at frequencies close to the chopping frequency. There are a number of PWM variants (scalar, vectorial, etc.).

Another modulation technique used in converters is the technique known as SHE (Selective Harmonic Elimination). This technique allows reproducing a pulse train with previously calculated switching angles, with the particular characteristic that as many harmonics as possible (those which have been selected to be eliminated) of the resulting waveform are eliminated. To find the solutions to a SHE problem, it is necessary to solve a complex system of non-linear equations, which is done offline in a PC, and finally the solutions are inserted in tabulated form in the code of the converter.

A variant of SHE is the technique known as SHM (Selective Harmonic Mitigation) which, without completely eliminating the selected harmonics like in the case of SHE modulation, is capable of reducing their value and also the value of other harmonics. The advantage in this case is that the number of harmonics mitigated is greater than the number of eliminated harmonics with SHE modulation, and the drawback is that mitigation involves a reduction in the amplitude of the harmonics and not in the elimination thereof. Like in SHE modulation, the calculation of the edges of the waveform is also performed offline, and the results are saved in a table for subsequent access to same online.

EP3657653A1, which belongs to the applicant, discloses a modulation method for a power conversion system with a converter with a plurality of switches. With the method, taking as a reference an original waveform with certain harmonics which is obtained from specific switching angles applied on the switches, an output waveform with the required harmonics is obtained. In the method, a harmonic sensitivity matrix is calculated with respect to switching angles of the original waveform and the inverse thereof; and the difference between said harmonics and those required is calculated, said difference is multiplied by the inverse sensitivity matrix, and the sum of said result and the switching angles is applied to the switches of the converter.

The document "Unified Selective Harmonic Elimination Control for four-Level Hybrid-Clamped Inverters", WU MINGZHE et Al. (IEEE Transactions on Power Electronics, Institute of Electrical and Electronics Engineers, USA) discloses a unified selective harmonic elimination (SHE) control for four-level hybrid-damped (4L-HC) inverters. With this unified strategy, all four-level switching patterns and the corresponding switching angles can be obtained simultaneously by solving one group of unified four-level SHE equations. Therefore, the optimal switching pattern of each modulation index with the designed optimization goal can be evaluated, and the best overall output performance is achieved. The proposed voltage control method is based on redundant switching states and introducing a slight variation of the precalculated switching angles, which extends or limits the conduction time of capacitors depending on voltage deviation and current direction.

The document "A new approach to solving the harmonic elimination equations for a multilevel converter", Chiasson J N et Al. (Conference record of the 2003 IEEE Industry Applications Conference 38$^{th}$) discloses a method to compute the switching angles in a multilevel converter so as to produce the required fundamental voltage, while at the same time not to generate higher order harmonics. In this document it is shown that the theory of symmetric polynomials can be exploited to reduce the degree of the polynomial equations that must be solved which in turn greatly reduces the computational burden.

DISCLOSURE OF THE INVENTION

The object of the invention is to provide a method for obtaining switching angles for a plurality of switches of a power electronic converter and an associated conversion system, as defined in the claims.

A first aspect of the invention relates to a method for obtaining the switching angles for the switches, giving rise to an AC signal at the output of the converter with the required modulation index. In the method, a plurality of different possible values for the modulation index of said AC output signal are established within a predetermined range of values; the range of values is divided into a plurality of contiguous segments, such that each segment comprises a plurality of the possible values established; and a specific value is obtained for each of the switching angles in each segment and for each of the possible values for the modulation index, all the switching angles of each possible value forming a switching pattern.

In the method, it is furthermore considered that the highest possible value for the modulation index of a first segment is a boundary value of said first segment and is equal to the minimum possible value for the modulation index of a second segment contiguous to the first segment, said minimum possible value being a boundary value of said second segment; all the values obtained for each of the switching angles over the entire range of values are joined together, forming a switching curve for each switching angle as result of said union; and since the switching patterns are generated associated with a boundary value shared by two contiguous segments, the height or amplitude, and slope, of the switching curve (SC) in a boundary value of a segment that is shared with another contiguous segment is equal to the height or amplitude and slope of the switching curve in said shared boundary value when in said contiguous segment. Therefore, continuity when changing the value for the modulation index which involves a change of segment is ensured, and discontinuities in the switching angles when changing segments are prevented across the entire range of values of the modulation index.

It has been detected that with known modulation methods of the state of the art, a plurality of switching patterns are obtained for a specific range of possible values for the modulation index. If switching patterns for values for the modulation index that are outside of said range are to be obtained, a new algorithm must be resolved for obtaining said switching patterns, and in general a discontinuity is generated between the values of the switching angles when changing segment, where there is no continuous switching curve for the switching angles (at least for some of said switching angles), which may involve drawbacks when implemented in systems (both in the switches themselves and in the resulting electrical signals).

With the proposed method, when the segment is changed in a change of the possible value for the modulation index, continuity is maintained in the switching curves of the different switching angles, such that said switching curves are continuous across the entire range of values of the modulation index, and the drawbacks indicated above in the system implementing the switching angles obtained with the method are overcome.

A second aspect of the invention relates to a DC power to AC power conversion system comprising at least one power electronic converter and one control unit communicated with said converter. The converter comprises a DC input, an AC output, and a switch block through which the input and the output are connected to one another. The switch block comprises a plurality of controllable switches, and the control unit is configured for controlling the state of said switches.

The control unit is configured for controlling the state of the switches of the switch block of the converter based on the switching angles obtained with the method of the first aspect of the invention.

These and other advantages and features of the invention will become apparent in view of the figures and detailed description of the invention.

DETAILED DISCLOSURE OF THE INVENTION

Figure 1:
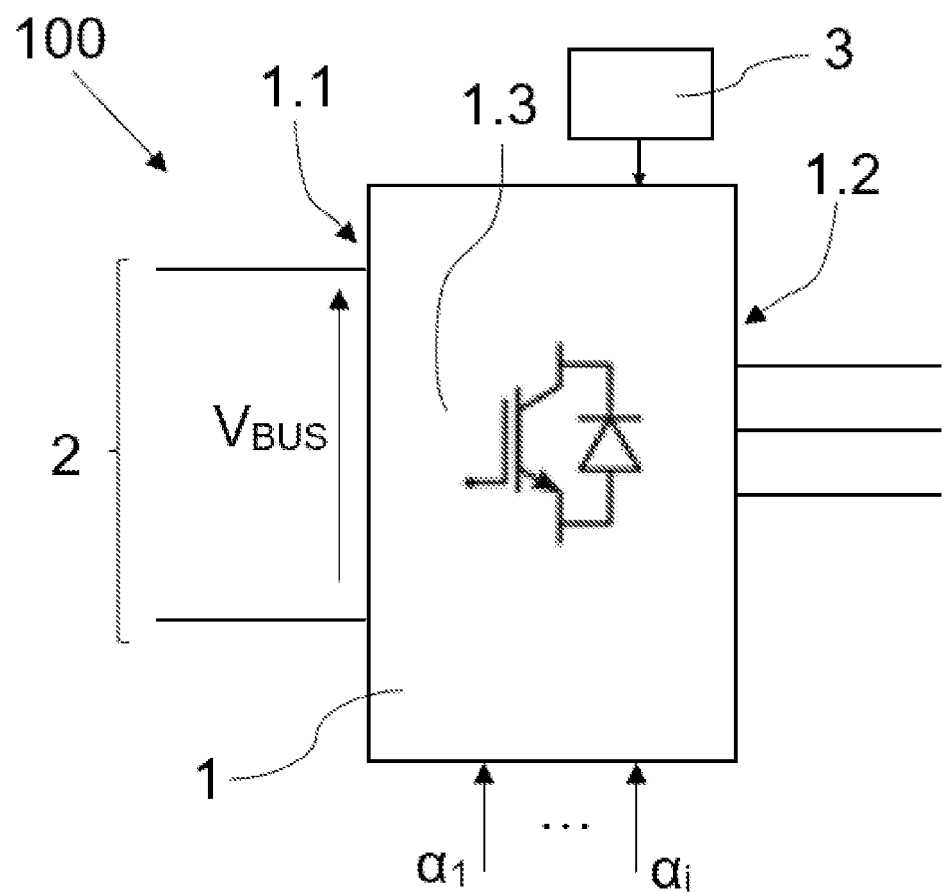
FIG. 1 schematically shows an embodiment of the conversion system according to the invention.

A first aspect of the invention relates to a method suitable for obtaining the switching angles $\alpha_1, \ldots, \alpha_i$ for a plurality of controllable switches 1.3 of a power electronic converter 1, for the purpose of obtaining a required AC signal having a predetermined modulation index at an output 1.2 of said converter 1. Controllable switches 1.3 must be understood to mean that the opening and closing (switching) thereof can be controlled, the state of each switch 1.3 being open or closed. The switching angles $\alpha_1, \ldots, \alpha_i$ associated with a switch 1.3 refer to the switching instant of said switch 1.3, said switching angles $\alpha_1, \ldots, \alpha_i$ and the switching instants are therefore proportionally related to one another, through the fundamental frequency of the AC output signal.

The converter 1 is a DC power to AC power converter and comprises a DC input 1.1, an output 1.2, and a switch block 1.0 through which the input 1.1 and the output 1.2 are connected to one another, the switch block 1.0 comprising the controllable switches 1.3. The power reaching the output 1.2 from the input 1.1 depends on the state of the switches 1.3 at all times and said switches 1.3 are controlled to obtain the desired AC signal at said output 1.2 by means of a control unit 3. The control unit 3 may comprise a microcontroller, a microprocessor, an FPGA, or any device with computing capability, for example.

The input 1.1 of the converter 1 is connected to a DC bus 2, and the DC bus 2 can be connected, for example, to a DC power source or to a power grid (through an AC/DC converter, for example), where Vbus is a voltage across the DC bus 2. The converter 1 thereby converts the DC power of the DC bus 2 to AC power, in order to supply it where it is required (through the output 1.2, which will be connected where required for said supply to be carried out). The method is thereby suitable for controlling the switching of switches 1.3 of the converter 1 such that there is, at the output 1.2, a desired sinusoidal (or quasi-sinusoidal) periodic output waveform.

The frequency of the output waveform depends on the application, i.e., on which said output waveform is going to be supplied and is predetermined. For example, if it is going to be supplied to a European power grid, said frequency is 50 Hz.

Since it is a periodic and has a sinusoidal (or quasi-sinusoidal) form, the output signal can be divided into quadrants, and being able to determine the switching angles $\alpha_1, \ldots, \alpha_i$ in one of said quadrants is sufficient. The switching angles $\alpha_1, \ldots, \alpha_i$ for the rest of the quadrants can be obtained from these switching angles by symmetries. The number of switching angles $\alpha_1, \ldots, \alpha_i$ for each quadrant can be preselected, and x switching angles $\alpha_1, \ldots, \alpha_i$ per quadrant are usually selected.

With the method, in addition to controlling the amplitude of the AC signal, the presence of the harmonics therein is also controlled, the selected harmonics being eliminated and/or mitigated. Some harmonics are negative for power grids, so when connecting a converter 1 to a power grid, it is appropriate to act on the most harmful ones. Furthermore, based on the power grid to which the converter 1 is connected, regulations relating to harmonics, which establish the maximum value allowed for each of the harmonics, must be fulfilled.

In the context of the invention, the value of a harmonic must be interpreted to mean the percentage of the amplitude of the voltage of the corresponding harmonic with respect to the voltage of the DC bus 2. Each harmonic in turn comprises two components, a sine component and a cosine component (in some cases one of them can be cancelled). Hereinafter, for the sake of clarity, the proposed method is explained considering only one of them, although the description would likewise apply to the other component.

The method is suitable for eliminating and/or mitigating preselected harmonics in the AC signal of the output 1.2 of the converter 1, and to that end specific switching angles $\alpha_1, \ldots, \alpha_i$ are obtained. Each switching angle $\alpha_1, \ldots, \alpha_i$ involves a change of state of the corresponding switch 1.3, which is closed (allows current from the input 1.1 to pass through same) or open (does not allow current from the input 1.1 to pass through same) and represents one instant within the period (360°) for the AC output signal in which said change of state (switching) is to be carried out. A switching angle of 20°, for example, thereby involves a change of state of the corresponding switch 1.3 in that instant of the AC output signal.

The possible modulation index required for the AC output signal of the converter 1 are usually predefined due to grid operator requirements to which the converter 1, for example, will be connected, and the values of the switching angles $\alpha_1, \ldots, \alpha_i$ of the switches 1.3 for each of the possible values IM for the modulation index are previously calculated. In that sense, for each of said possible values IM there is one switching pattern, which is not more than the value of all the switching angles $\alpha_1, \ldots, \alpha_i$ for each of the switches 1.3 of the converter 1. Therefore, when an AC signal with a modulation index having a specific value IM is required, the previously calculated corresponding switching pattern is applied on the switches 1.3 of the converter 1.

The method is thereby implemented offline, and the switching angles $\alpha_1, \ldots, \alpha_i$ obtained for each of the possible values IM for the modulation index are stored in a look-up table or the like. When an AC output signal for the converter 1 having a specific value IM for the modulation index is required, the switching pattern stored in the look-up tables corresponding to said value IM for the modulation index is applied on said converter 1. The look-up tables can be integrated in the control unit 3 itself, in another element of the system, or they can be stored in a specific memory for holding same.

In the method, a plurality of different possible values IM for the modulation index of said AC output signal are established within a predetermined range of values R; the range of values R is divided into a plurality of contiguous segments $S_1, \ldots, S_j$, such that each segment $S_1, \ldots, S_j$ comprises a plurality of the possible values IM established; and a specific value is obtained for each of the switching angles $\alpha_1, \ldots, \alpha_i$ in each segment $S_1, \ldots, S_j$ and for each of the possible values IM for the modulation index, all the switching angles $\alpha_1, \ldots, \alpha_i$ of each possible value IM being a switching pattern.

The different possible values IM established may only be those indicated by the grid operator or possible values IM established by the manufacturer to process or cover all the requests by different grid operators, to mention two examples.

The length of all the segments $S_1, \ldots, S_j$ may all be the same, as may be the number of possible values IM included in each segment $S_1, \ldots, S_j$, but they do not have to be.

In the method, it is furthermore considered that the maximum possible value IM for the modulation index of a first segment $S_1$ is equal to the minimum possible value IM for the modulation index of a second segment $S_2$ contiguous to the first segment $S_1$. Each segment $S_1, \ldots, S_j$ thereby comprises a maximum possible value IM and a minimum possible value IM, the maximum possible value IM being equal to the minimum possible value IM of the next contiguous segment $S_1, \ldots, S_j$. These values are also referred to as boundary values throughout the description. Naturally, the minimum possible value IM of the first segment $S_1$ and the maximum possible value IM of the last segment $S_1$ are not boundary values in the context of the invention, as they are not shared by two segments $S_1, \ldots, S_j$.

Figure 2:
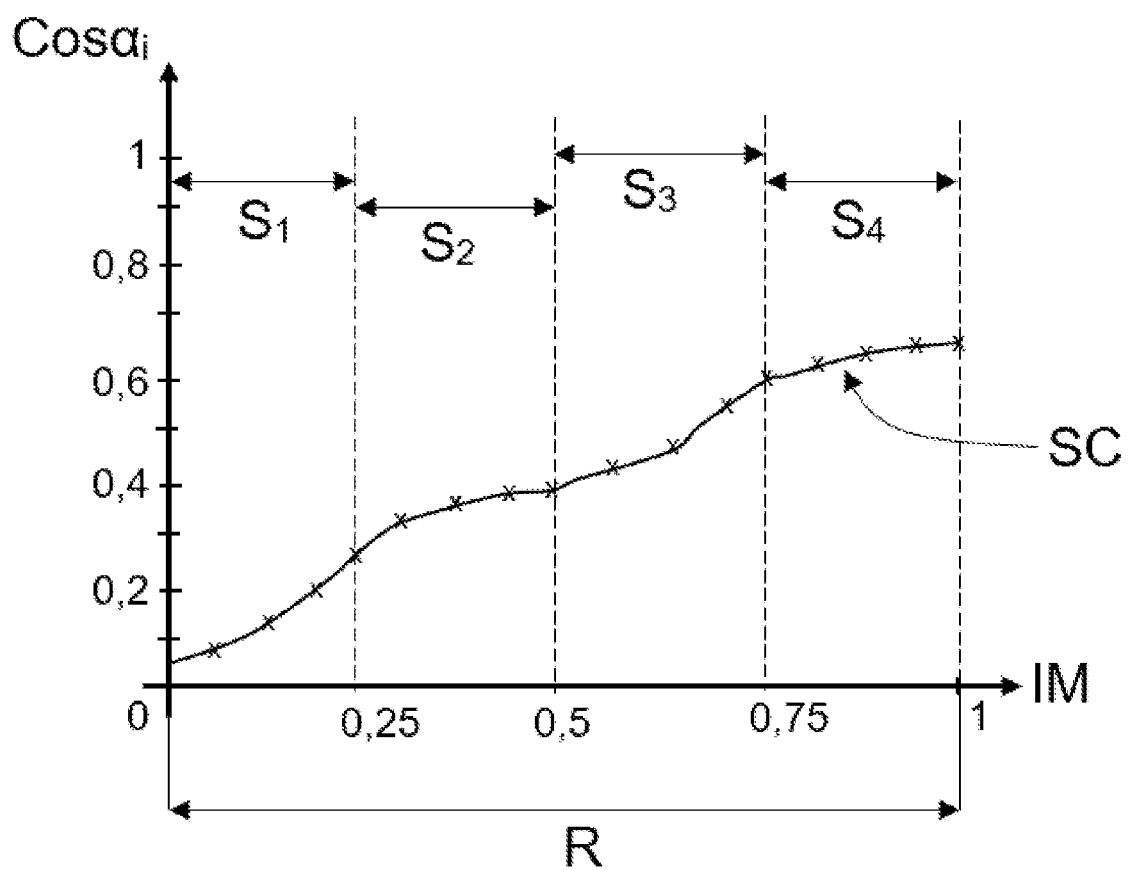
FIG. 2 depicts a switching curve of a switching angle for the entire range of values of the modulation index of the AC output signal, generated according to an embodiment of the method of the invention.

Each switching angle $\alpha_1, \ldots, \alpha_i$ obtained gives rise to a specific value in each of the values IM for which it is obtained, as represented with an x in FIG. 2. In the proposed method, a switching curve SC is generated for each switching angle $\alpha_1, \ldots, \alpha_i$, like the one represented in FIG. 2 by way of example, consisting of joining all these values obtained across the entire range of values R, and the method proposes having a continuous switching curve SC for each of the switching angles $\alpha_1, \ldots, \alpha_i$ over the entire range of values R. Therefore, when obtaining the switching angles $\alpha_1, \ldots, \alpha_i$ it is considered that each of the switching curves SC must have a constant height or amplitude and the slope in the boundary values shared by two contiguous segments $S_1, \ldots, S_j$. In other words, the height or amplitude and slope of the switching curve SC in the maximum possible value IM of the first segment $S_1$ must be equal to the height or amplitude and slope of the switching curve SC in the minimum possible value IM of the second segment $S_2$. Continuity when changing the value IM for the modulation index which involves a change of segment $S_1, \ldots, S_j$ is thereby ensured, and discontinuities in the switching angles $\alpha_1, \ldots, \alpha_i$ when changing segment $S_1, \ldots, S_j$ are prevented across the entire range of values R of the modulation index.

In the state of the art, when switching angles $\alpha_1, \ldots, \alpha_i$ are calculated, they are used for a specific range or segment from among a range of values IM for the modulation index, and if switching angles $\alpha_1, \ldots, \alpha_i$ are to be obtained for values IM for the modulation index outside of that range or segment, a new calculation is performed to obtain said values, which calculation is independent of the previously performed calculation, giving rise to the discontinuities described above and prevented with the proposed solution.

Figure 3:
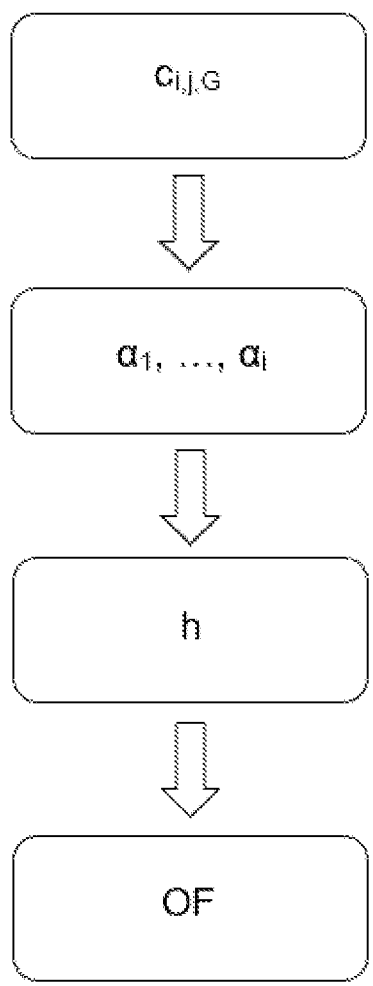
FIG. 3 depicts the nesting levels offered by the method of the invention for resolving the objective function.

To that end, the method uses a higher level than what is commonly used, where the value of switching coefficients $c_{i,j,G}$ is determined to obtain switching angles $\alpha_1, \ldots, \alpha_i$ from said switching coefficients $c_{i,j,G}$. In conventional techniques, the parameters to be clarified are directly the switching angles $\alpha_1, \ldots, \alpha_i$, and in the proposed method, however, these parameters are the switching coefficients $c_{i,j,G}$, the switching angles $\alpha_1, \ldots, \alpha_i$ being obtained from said switching coefficients $c_{i,j,G}$. These levels can be observed in FIG. 3. This allows the described polynomial, which is a continuous function, to be obtained, which allows the desired objective to be fulfilled.

In the method, a polynomial of degree G has been designed, in which polynomial the switching coefficients $c_{i,j,G}$ are related to the switching angles $\alpha_1, \ldots, \alpha_i$ and to the possible values IM for the modulation index, and said polynomial is defined as:

$$a_{i,j}(IM) = c_{i,j,0} + c_{i,j,1}*IM + \ldots + c_{i,j,G}*IM^G,$$

wherein:
IM is the corresponding possible value of the modulation index,
$c_{i,j,G}$ is an associated modulation coefficient,
G is the predetermined degree for said polynomial, and
$a_{i,j}$ is the cosine of the corresponding switching angle $\alpha_1, \ldots, \alpha_i$ such that said switching angle $\alpha_1, \ldots, \alpha_i$ is obtained from $a_{i,j}$.

This polynomial allows the parameters of the switching curve SC, such as height and slope, to be associated with the modulation index and with the switching angles $\alpha_1, \ldots, \alpha_i$. The modulation coefficient $c_{i,j,0}$, which is the modulation coefficient associated with degree 0 of the polynomial, corresponds with the height or amplitude of the corresponding switching curve SC in the corresponding value IM, the modulation coefficient which is the modulation coefficient associated with degree 1 of the polynomial, corresponds with the slope of the corresponding switching curve SC in the corresponding value IM, the modulation coefficient $c_{i,j,2}$, which is the modulation coefficient associated with degree 2 of the polynomial, corresponds with the curvature of the corresponding switching curve SC in the corresponding value IM, and so on and so forth. The switching coefficients $c_{i,j,0}$ and $c_{i,j,1}$ are thereby calculated to fulfill the previously described requirements of having one and the same height and one and the same slope in the boundary values shared by two contiguous segments $S_1, \ldots, S_j$.

Furthermore, for the polynomial to fulfill the required value IM for the modulation index, the polynomials must fulfill the following equations:

$$0 = c_{1,j,0} - c_{2,j,0} + c_{3,j,0} - c_{4,j,0} + \ldots + c_{i,j,0}, \quad \text{(equation 1)}$$

and $$1 = c_{1,j,1} - c_{2,j,1} + c_{3,j,1} - c_{4,j,1} + \ldots + c_{i,j,1}, \quad \text{(equation 2)}$$

The modulation index with degree 1 is associated with the switching coefficients $c_{i,j,1}$ of degree 1, so it is the relationship between said switching coefficients $c_{i,j,1}$ that must result in one and the rest must result in zero. Furthermore, as shown in the equations, the uneven switching angles $\alpha_1, \ldots, \alpha_i$ are added, because they are what cause the switches 1.3 to close and therefore allow the passage of power from the DC side to the AC side, whereas the even switching angles $\alpha_1, \ldots, \alpha_i$ are subtracted because they are what open said switches 1.3.

The method further comprises an optimization sequence which is executed a specific plurality of times. The more times it is executed, the more likely it is that a better result will be obtained. Each optimization sequence comprises a generation step and an optimization step. In the generation step, a switching pattern is generated for each possible value IM for the modulation index across the entire range of values R, a set of switching patterns being obtained for the entire range of values R in each generation step. The optimization step is executed after the generation step, and in said optimization step an objective function OF is resolved with the set of switching patterns obtained. After the execution of the optimization sequence said plurality of times, the set of switching patterns resulting in the lowest resulting value of the objective function OF is selected as the optimal set of switching patterns, said optimal set of switching patterns being stored in a look-up table for the implementation thereof on the converter 1 when required.

In each generation step, a switching pattern is obtained for each possible value IM for the modulation index (from the entire range of values R), the corresponding polynomials (the same polynomial but with different switching coefficients in each case) being solved. When resolving a polynomial, values of the specific modulation coefficients, which can be obtained from a previously or arbitrarily defined look-up table, are used. Therefore, in each generation step a plurality of switching patterns forming a switching set are obtained. When another generation step is executed again, the values of the coefficients to be used when resolving the polynomials are modified (the values can be obtained from a previously or arbitrarily defined look-up table).

Since term $a_{i,j}(IM)$ of the polynomial defines the cosine of the corresponding switching angle $\alpha_1, \ldots, \alpha_i$, the value of the modulation coefficient $c_{i,j,0}$ is limited between 0 and 1 (maximum and minimum values for $a_{i,j}(IM)$, which are the maximum and minimum values for the cosine). From this limitation, the rest of the switching coefficients are also limited in that $a_{i,j}(IM)$ must be between 0 and 1 and the modulation index must also be between 0 and 1 (the range of values R). Therefore, based on the point of the switching curve SC from which it starts, the values of the rest of the switching coefficients will have different limits in each case.

Using an objective function OF such as the one described above is common in the sector and said objective function OF is designed taking into account the objective required for the harmonics of an AC signal when calculating the switching angles $\alpha_1, \ldots, \alpha_i$. The purpose of these objective functions OF is to minimize the total harmonic distortion (THD), with the set of switching patterns resulting in a lower value of the objective function OF therefore being the optimal set of switching patterns, given that it is the set of switching patterns that minimizes to a greater extent the total harmonic distortion. The objective function OF required in each case can be used or designed provided that said objective of minimizing harmonic distortion is maintained, and the following objective function OF has been designed into the method:

$$OF = \sqrt[pow]{\sum_{IM}\sum_{h}\left(\frac{V_h(IM)}{PesoInv(IM,h)}\right)^{pow}}, \quad \text{(equation 3)}$$

wherein:
OF: Objective function.
h: the corresponding harmonic.
$V_h(IM)$: amplitude of the corresponding harmonic.
PesoInv(IM, h) is a numerical weight.
Pow is a numerical exponent.

Using a weight such as Pesolnv(IM, h) in equation 3, and doing so in that way, allows said weight to assign a weight to each harmonic as required. For example, by setting Pesolnv(IM, h) equal to a constant number, said constant number is applied to each of the harmonics, with all of them having a weight assigned in the same way. However, it is also possible for there to be a different value for Pesolnv(IM, h) for different harmonics, such that a weight can be applied to each harmonic specifically as required (with a larger number of Pesolnv(IM, h) if the corresponding harmonic, for example, is to be reduced to a greater extent).

In turn, using an exponent like Pow in equation 3, and doing so in the same way, allows said exponent to assign a higher weight to the most unfavorable harmonic, an effect that is best shown the higher the value of Pow (a high value of Pow has a greater effect on high harmonics). The value of Pow is preferably greater than 2 and even.

The amplitude of the corresponding harmonic can be calculated in a known manner, such as by the following equation for example:

$$Vh = \frac{Vbus}{2} \frac{1}{h} \sum_{i=1}^{N} \pm Th(ai). \quad \text{(equation 4)}$$

wherein N is the number of switching angles and $T_h(a_i)$ is a Chebyshev polynomial of the first kind.

A second aspect of the invention relates to a DC power to AC power conversion system comprising at least one power electronic converter 1 and one control unit 3, as depicted in FIG. 1 by way of example. The converter 1 comprises a DC input 1.1, which can be coupled to a DC bus 2 which can be connected, for example, to a DC power source or to a power grid (through an AC/DC converter, for example); an AC output 1.2, which can be coupled to an AC load such as a power grid, for example; and a switch block 1.0 through which the input 1.1 and the output 1.2 are connected to one another. The switch block 1.0 comprises a plurality of controllable switches 1.3, and the control unit 3 is configured for controlling the state of said switches 1.3.

The control unit 3 is configured for controlling the state of the switches 1.3 of the switch block 1.0 of the converter 1 based on the switching angles ($\alpha_1, \ldots, \alpha_i$) obtained with the method according to any of the embodiments and/or configurations.

In some embodiments, the system comprises a memory configured for storing the switching angles $\alpha_1, \ldots, \alpha_i$ obtained with said method, the control unit 3 being communicated with said memory. In other embodiments, it is the control unit 3 that comprises said memory.

The invention claimed is:

1. A method for obtaining switching angles ($\alpha 1, \ldots, \alpha i$) for a plurality of switches of a power electronic converter, for obtaining an AC output signal having a specific modulation index at an output of said converter, the method comprising:
    establishing a plurality of different possible values (IM) for the modulation index of said AC output signal within a predetermined range of values (R);
    dividing the range of values (R) into a plurality of contiguous segments (S1, . . . , Sj), such that each segment (S1, . . . , Sj) comprises a plurality of the established possible values (IM); and
    obtaining a specific value for each of the switching angles ($\alpha 1, \ldots, \alpha i$) in each segment (S1, . . . , Sj) and for each of the possible values (IM) for the modulation index, all the switching angles ($\alpha 1, \ldots, \alpha i$) of each of the possible values (IM) forming a respective switching pattern, wherein a maximum possible value (IM) for the modulation index of a first segment (S1) is a boundary value of said first segment (S1) and is equal to a minimum possible value (IM) for the modulation index of a second segment (S2) contiguous to the first segment (S1), and said minimum possible value (IM) being a boundary value of said second segment (S2);
    joining together all the values obtained for each of the switching angles ($\alpha 1, \ldots, \alpha i$), in each of the possible values (IM) for the modulation index over the entire range of values (R), forming a switching curve (SC) for each switching angle ($\alpha 1, \ldots, \alpha i$); and
    whereby generating the switching pattern at a boundary value shared by two contiguous segments (S1, . . . , Sj), for each of said segments (S1, . . . , Sj), the height or amplitude, and slope, of the switching curve (SC) in a boundary value of a segment (S1, . . . , Sj) that is shared with another contiguous segment (S1, . . . , Sj) is equal to the height or amplitude and slope of the switching curve (SC) in said shared boundary value when in said contiguous segment (S1, . . . , Sj), ensuring continuity when changing the value (IM) for the modulation index which involves a change of segment (S1, . . . , Sj) and preventing discontinuities in the switching angles ($\alpha 1, \ldots, \alpha i$) across the entire range of values (R) of the modulation index when changing segments (S1, . . . , Sj);
    the method further comprising a generation step and an optimization sequence,
    wherein the generation step obtains a switching pattern for each of the possible values (IM) for the modulation index in the entire switching range (R), with all the switching patterns obtained forming a set of switching patterns, wherein the generation step executes a polynomial of a degree (G) equal to or greater than one at least one time for each switching angle ($\alpha 1, \ldots, \alpha i$), said polynomial being defined as $ai,j(IM)=ci,j,0+ci,j,1*IM+ \ldots +ci,j,G*IM\ G,$ wherein ci,j,G is a modulation coefficient; G is the predetermined degree for said polynomial; ai,j(IM) is the cosine of the corresponding switching angle ($\alpha 1, \ldots, \alpha i$), such that said switching angle ($\alpha 1, \ldots, \alpha i$) is obtained from ai,j(IM); i is the switching angle ($\alpha 1, \ldots, \alpha i$) to be obtained; and j is the segment (S1, . . . , Sj) to which said switching angle ($\alpha 1, \ldots, \alpha i$) belongs, with the modulation coefficient ci,j,0 representing the height or amplitude of the corresponding switching curve (SC) in the corresponding segment (S1, . . . , Sj) and the modulation coefficient ci,j,1 representing the slope of the corresponding switching curve (SC) in the corresponding segment (S1, . . . , Sj), and taking into account the following equations when solving the polynomials in said generation step $0=c1,j,0-c2,j,0+c3,j,0-c4,j,0 \pm ci,j,0,$ and $1=c1,j,1-c2,j,1+c3,j,1-c4,j,1 \pm ci,j,1,$ and the optimization sequence is executed a plurality of times, each optimization sequence comprising a corresponding generation step and an optimization step performed after the corresponding generation step, the optimization step comprising solving an objective function (OF) with the set of switching patterns obtained in the preceding generation step, and after executing the optimization sequence said plurality of times, the method further comprising selecting the set of switching patterns resulting in a lowest resulting value of the objective function (OF) as the optimal set of switching patterns, with the switching angles ($\alpha 1, \ldots, \alpha i$) of said optimal set of switching patterns being the switching angles ($\alpha 1, \ldots, \alpha i$) obtained for the plurality of switches of the converter, said objective function (OF) minimizing total harmonic distortion (THD), wherein the obtained switching angles ($\alpha 1, \ldots, \alpha i$) are stored in a computer readable memory.

2. The method according to claim 1, wherein values of the modulation coefficients (c1,j,G) are modified for each corresponding generation step, different sets of switching patterns thereby being obtained in the different generation steps.

3. The method according to claim 1, wherein the first time a polynomial is executed for a switching angle ($\alpha 1, \ldots, \alpha i$) having a possible value for the modulation index (IM), random switching coefficients (c1,j,G) are used.

4. The method according to claim 1, wherein the first time a polynomial is executed for a switching angle ($\alpha 1, \ldots, \alpha i$) having a possible value for the modulation index (IM), predetermined switching coefficients (c1,j,G) are used.

5. The method according to claim 1, wherein the objective function (OF) is defined as $$OF = \sqrt[pow]{\sum_{IM}\sum_{h}\left(\frac{V_h(IM)}{PesoInv(IM, h)}\right)^{pow}},$$

wherein OF is the objective function, h is the corresponding harmonic, Vh(IM) is the amplitude of the corresponding harmonic, PesoInv(IM, h) is a numerical weight, and Pow is a numerical exponent.

6. The method according to claim 5, wherein the amplitude $V_h$(IM) of the corresponding harmonic is calculated using the equation $$Vh = \frac{Vbus}{2}\frac{1}{h}\sum_{i=1}^{N} \pm Th(ai),$$

wherein N is the number of switching angles and $T_h(a_i)$ is a Chebyshev polynomial of the first kind, and Vbus is a voltage across an input bus of the power electronic converter.

7. A DC power to AC power conversion system comprising at least one power electronic converter and one control unit configured for communication with said converter, the converter comprising a DC input, an AC output and a switch block through which the input and the output are connected to one another, the switch block comprising a plurality of controllable switches, and the control unit being configured for controlling the state of said switches, wherein the control unit is configured for controlling the state of the switches of the switch block of the converter based on the switching angles ($\alpha_1, \ldots, \alpha_i$) obtained with the method according to claim 1.

8. The DC power to AC power conversion system according to claim 7, further comprising a the memory configured for storing the obtained switching angles ($\alpha 1, \ldots, \alpha i$) obtained configured to be in communication with said memory.

9. A DC power to AC power conversion system according to claim 7, wherein the control unit comprises a the memory configured for storing the obtained switching angles ($\alpha 1, \ldots, \alpha i$).

* * * * *